United States Patent [19]

Riddell

[11] Patent Number: 4,969,999
[45] Date of Patent: Nov. 13, 1990

[54] CYLINDRICAL SCREEN CONSTRUCTION FOR A FILTER AND METHOD OF PRODUCING THE SAME

[75] Inventor: William A. Riddell, Wellesbourne, England

[73] Assignee: Nelson Industries Inc., Stoughton, Wis.

[21] Appl. No.: 445,287

[22] Filed: Dec. 4, 1989

[51] Int. Cl.⁵ .................................... B01D 29/00
[52] U.S. Cl. .................. 210/497.01; 55/491; 55/498; 55/514; 55/525; 156/157; 156/218; 156/304.3; 210/499
[58] Field of Search ............ 156/157, 218, 304.3, 156/306.6; 55/355, 491, 498, 514, 525; 210/232, 488, 497.01, 496, 498, 489

[56] References Cited

U.S. PATENT DOCUMENTS

| | | | |
|---|---|---|---|
| 3,674,154 | 7/1972 | Sicard | 210/499 X |
| 3,765,537 | 10/1973 | Rosenberg | 210/499 X |
| 3,970,079 | 7/1976 | Gaylord | 156/157 X |
| 4,740,303 | 4/1988 | Greutert et al. | 210/499 X |

*Primary Examiner*—Charles Hart
*Attorney, Agent, or Firm*—Andrus, Sceales, Starke & Sawall

[57] ABSTRACT

A cylindrical screen construction for a filter and a method of producing the screen. A sheet of metal screen containing a multiplicity of holes is rolled into cylindrical form and the longitudinal edges of the sheet are joined by a thermoplastic connecting strip. The strip is generally H-shaped in cross section having a pair of opposed longitudinal grooves that receive the respective edges of the sheet. Heat and pressure are applied to the strip causing the thermoplastic material to fuse and penetrate the holes along the side edges of the screen to provide a smooth surfaced mechanically interlocked joint between the edges.

6 Claims, 1 Drawing Sheet

CYLINDRICAL SCREEN CONSTRUCTION FOR A FILTER AND METHOD OF PRODUCING THE SAME

BACKGROUND OF THE INVENTION

Industrial filters, such as liquid-gas separators, include a filter element that is surrounded by a metal screen that is typically formed of expanded metal. To form the cylindrical screen, a sheet of screen material is rolled into cylindrical form and the opposed longitudinal edges are joined by a metal clip which is clamped to the edges.

In practice it has been found that in some cases the metal clip will not securely fasten the edges of the screen together with the result that the screen could unroll. Further, the clamped joint using the metal clip may not be entirely smooth so that edges of the screen could by exposed which could cut or tear the paper of the filter element.

SUMMARY OF THE INVENTION

The invention is directed to an improved cylindrical screen construction for use in a filter and to a method of producing the screen. In accordance with the invention, a sheet of metal screen containing a multiplicity of holes is rolled into cylindrical form and the longitudinal edges are joined by a thermoplastic connecting strip. The strip is generally H-shaped in cross section having a pair of opposed longitudinal grooves that receive the respective edges of the screen. After insertion of the edges of the screen into the grooves, heat and pressure are applied to the strip, causing the thermoplastic material to fuse and penetrate into the holes at the side edges of the screen, thereby providing a smooth, mechanically interlocked joint between the edges.

As the thermoplastic material is interlocked into the openings or holes of the screen, a positive connection is provided which will not break during handling or transporting of the filter element.

The invention provides a smooth surface joint which completely covers the longitudinal edges of the metal screen so that there are no sharp exposed edges which could cut or tear the filtering media.

As the connector is formed of plastic material, it is corrosion resistant.

Other objects and advantages will appear during the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

The drawings illustrate a cylindrical metal screen 1, preferably formed of expanded metal, and which can be used to retain a filter medium in a filter element. Screen 1 contains a multiplicity of holes or openings 2 and the longitudinal edges 3 of the screen are joined together by a thermoplastic connecting strip 4.

Figure 2:
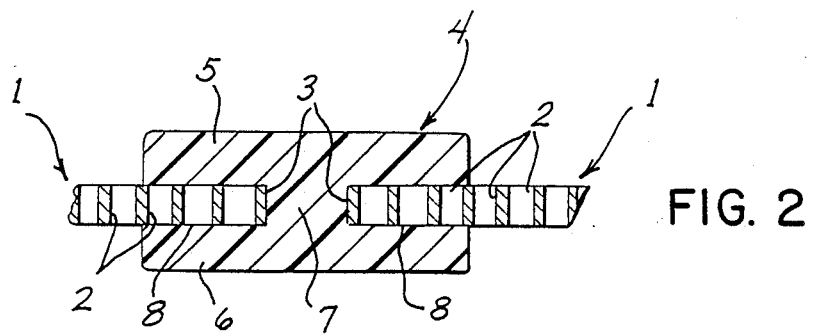
FIG. 2 is an enlarged fragmentary transverse section showing the insertion of the edges of the screen into the grooves in te strip.

Strip 4 is formed of a thermoplastic material, such as polyethylene, nylon, polyvinylchloride, polypropylene or the like, and as best illustrated in FIG. 2, as a generally H-shaped cross section. More specifically, strip 4 includes a pair of parallel sections 5 and 6 which are joined together by a central rib 7 that extends normal to sections 5 and 6. The spaces between sections 5 and 6 define a pair of opposed grooves 8 which receive the longitudinal edges 3 of the screen, as illustrated in FIG. 2.

Figure 3:
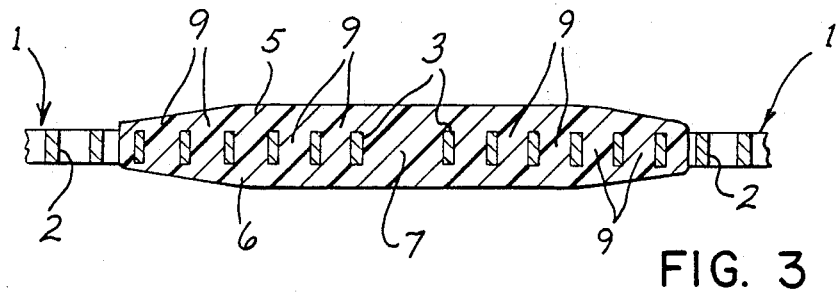
FIG. 3 is a view similar to FIG. 2 showing the interlocked joint between the screen and the connector.

After screen 1 has been rolled to cylindrical shape and the edges 3 inserted within grooves 8, heat and pressure are applied to the strip 4 causing the thermoplastic material to melt or fuse and penetrate into the openings 2 along the side edges 3 of the screen, as indicated by 9 in FIG. 3. The penetration of the thermoplastic material into holes 2 provides a mechanical interlock extending through the side edges of the screen to securely fix the screen to the connector strip 4.

Figure 1:
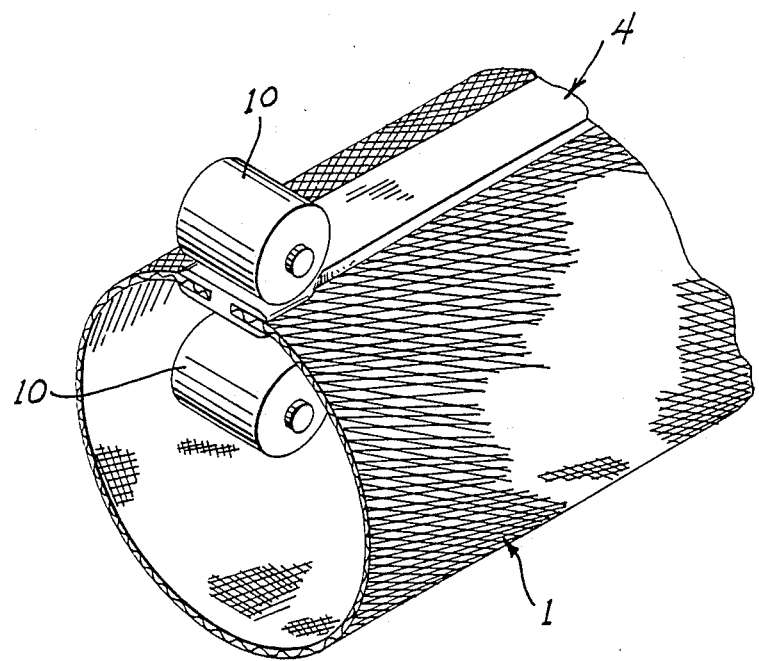
FIG. 1 is a diagramatic perspective view showing the method of forming the cylindrical screen.

The manner in which the heat and pressure is applied to strip 4 is not critical, and as illustrated in FIG. 1, this can be accomplished by a pair of heated rollers 10 which contact opposite surfaces of strip 4 and move along the length of the strip. The rollers will heat the thermoplastic material to the temperature sufficient to fuse the material, generally to a temperature in the range of 200° to 650° F., and the rollers apply sufficient pressure to force the fused thermoplastic material into the holes 2 to provide the mechanical interlock.

The pressure exerted by rollers 10 also provides smooth inner and outer surfaces at the joint area, with the edges 3 of the screen being completely embedded so that there are no sharp exposed edges which could cut or tear the filter medium.

The invention provides a simple and inexpensive manner of producing a cylindrical screen for a filter in which the thermoplastic connecting strip is mechanically interlocked with the edges of the screen. As the connecting strip 4 is formed of a plastic material, it is corrosion resistant and will not deteriorate during service.

Various modes of carrying out the invention are contemplated as being within the scope of the following claims particularly pointing out and distinctly claiming the subject matter which is regarded as the invention.

I claim:

1. A method of producing a cylindrical screen for a filter, comprising the steps of forming a sheet of foraminous metal having a multiplicity of openings into a generally cylindrical shape and positioning a pair of longitudinal side edges of said sheet in generally abutting relation, inserting said edges into opposed grooves in a thermoplastic connecting strip, said strip having a generally H-shaped cross section, and applying heat and pressure to said strip to fuse the thermoplastic material and penetrate the fused material into said openings to interlock said strip with the edges of said sheet.

2. The method of claim 1, wherein the step of applying heat to said strip comprises heating the strip to a temperature in the range of 200° to 650° F.

3. A method of producing a cylindrical screen for use in a filter, comprising the steps of forming a sheet of metal screen having a multiplicity of holes into generally cylindrical shape and positioning a pair of longitudinal side edges of said screen in generally abutting relation, forming a thermoplastic material into a connecting strip having a generally H-shaped cross section and including a pair of opposed longitudinal grooves, inserting the edges of said screen into said opposed grooves to thereby provide a joint, applying heat and pressure to said joint to fuse the thermoplastic material and penetrate the fused material into said holes to interlock said strip with the edges of said screen.

4. A cylindrical screen construction for use in a filter element, comprising a cylindrical sheet of foraminous material containing a multiplicity of openings, said sheet having a pair of longitudinal edges disposed in generally abutting relation, a thermoplastic connecting strip joining said edges, said strip having opposed grooves to receive said edges, said strip including isolated portions extending through said openings in the side edges of said sheet to provide a mechanical interlock between said strip and said side edges.

5. The screen construction of claim 4, wherein said connecting strip includes a pair of generally parallel spaced members and a central rib connecting the central portions of said members, said spaced members defining said opposed grooves.

6. The screen construction of claim 5 wherein said isolated portions are integral with said spaced members.

* * * * *